(12) United States Patent
Sakamoto et al.

(10) Patent No.: US 6,595,670 B2
(45) Date of Patent: Jul. 22, 2003

(54) MIRROR ASSEMBLY FOR VEHICLE

(75) Inventors: Masato Sakamoto, Niwa-gun (JP); Yoshihiro Fujikawa, Toyota (JP); Masayuki Noda, Toyota (JP); Kikuhiro Ohsawa, Shimizu (JP)

(73) Assignee: Kabushiki Kaisha Tokai-Rika-Denki Seisakusho, Aichi-ken (JP)

( * ) Notice: Subject to any disclaimer, the term of this patent is extended or adjusted under 35 U.S.C. 154(b) by 9 days.

(21) Appl. No.: 09/826,415

(22) Filed: Apr. 5, 2001

(65) Prior Publication Data

US 2001/0030872 A1 Oct. 18, 2001

(30) Foreign Application Priority Data

Apr. 11, 2000 (JP) ........................................ 2000-109971

(51) Int. Cl.[7] ................................................. B60Q 1/26
(52) U.S. Cl. ........................ 362/494; 362/549; 362/140; 362/226
(58) Field of Search ................................. 362/494, 135, 362/140, 549, 546, 226, 396, 544, 368

(56) References Cited

U.S. PATENT DOCUMENTS 5,497,306 A    3/1996  Pastrick
5,669,704 A  * 9/1997  Pastrick ...................... 362/494
6,000,823 A  * 12/1999 Desmond et al. ........... 362/494

FOREIGN PATENT DOCUMENTS

| JP | 61-129645 | 8/1986 |
| JP | 9-48284 | 2/1997 |

* cited by examiner

Primary Examiner—Thomas M. Sember
(74) Attorney, Agent, or Firm—Nixon Peabody LLP; Thomas W. Cole

(57) ABSTRACT

A mirror assembly particularly adopted as a side view mirror for a vehicle, the assembly being provided a mirror, a mounting plate for supporting the mirror, a light assembly having a lens at one end, a visor for accommodating the mirror and the light assembly. A joint element pivotally mounts a side of the light assembly to the mounting plate. The visor has a visor opening into which the lens is fitted, and a connection element for movably connecting an end of the visor opening and an end of the lens. A bias element in the form of a spring pivotally biases the end of the light assembly having the lens such that the connection element substantially closes any gap between the visor opening and the lens.

22 Claims, 4 Drawing Sheets

F I G. 3
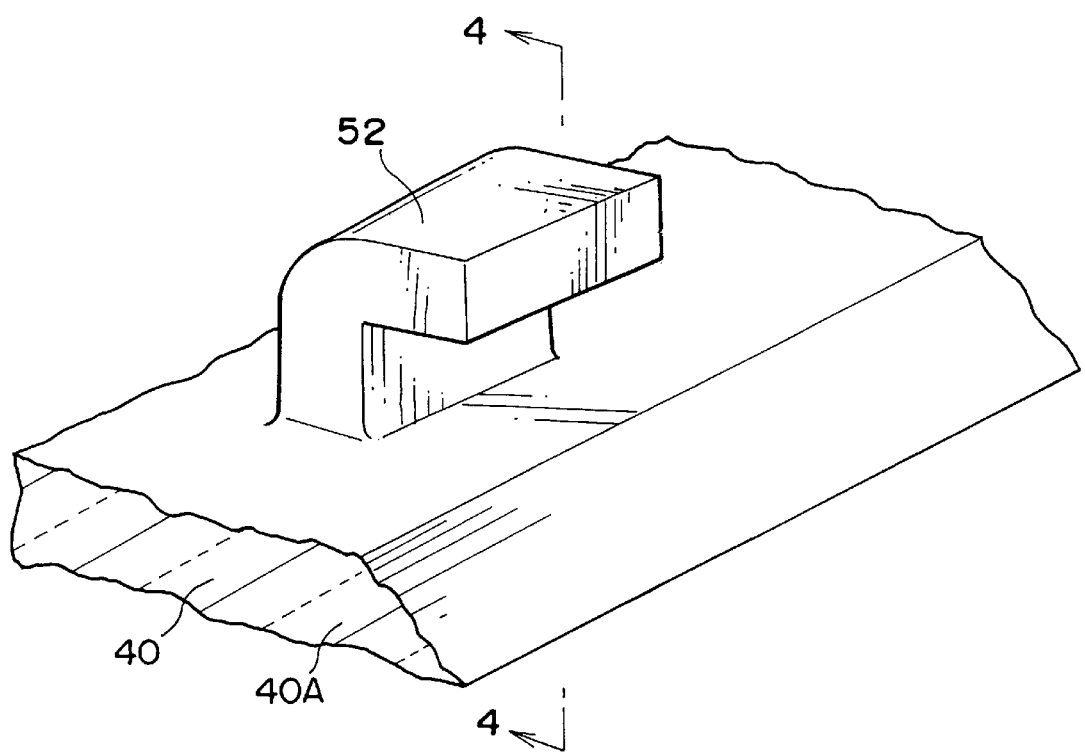

F I G. 4
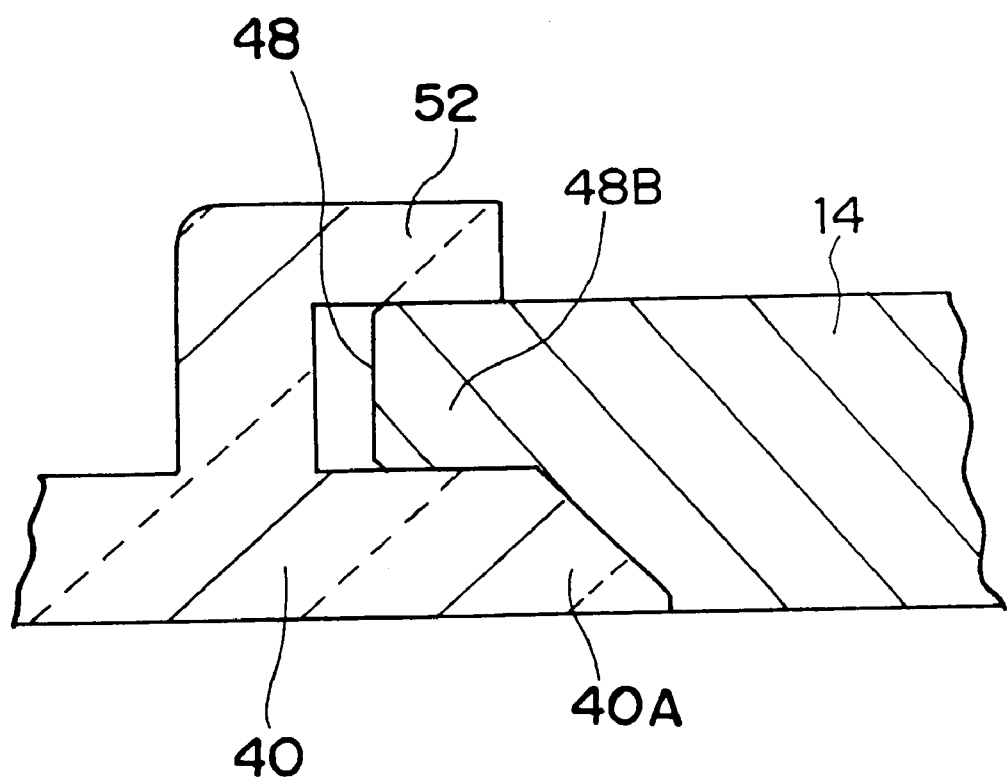

MIRROR ASSEMBLY FOR VEHICLE

BACKGROUND OF THE INVENTION

1. Field of the Invention

The present invention relates to a vehicle mirror assembly having a light assembly.

2. Description of the Related Art

Conventionally, an outer, rearview mirror device for a vehicle has been proposed in which a light module is supplementarily installed, with the light module used for illuminating a road surface in the vicinity of a side of the vehicle body. An example in which this kind of prior art is disclosed includes Japanese Patent Application Laid-Open (JP-A) No. 9-48284.

In the outer mirror device disclosed in JP-A No. 9-48284 (see especially FIG. 23 of the same), a frame or mounting plate (fixed panel) is accommodated in a visor cover, and a pair of engaging pawls is formed at a lower end portion of the frame. A pair of engaged portions formed in a bridge-like configuration is formed at a surface of the light module in the rear direction of the vehicle to correspond to the engaging pawls. By inserting and engaging the pair of engaging pawls into the pair of engaged portions, the light module is fixed to the frame in a state in which it is accommodated in a space between the visor cover and the frame.

However, in the structure disclosed in JP-A No. 9-48284, because the light module is first fixed to the frame, the frame is fixed to the visor cover, and then the light module or the lens is mounted to the visor cover, a substantial step (i.e., a difference in level) is created at a boundary between the lens of the light module and the visor cover. Both the visor cover and the lens of the light module are parts that structure the design surface of the vehicular outer mirror assembly. Therefore, when the dimensional precision of the boundary at which the visor cover and the lens come together is poor, the quality of the outer appearance of the vehicular outer mirror assembly drops. That is, in the vehicular outer mirror assembly disclosed in JP-A No. 9-48284, attention has been given to fixing the light module to the frame but not to the design of the boundary at which the visor cover and the lens of the light module meet.

SUMMARY OF THE INVENTION

In view of the aforementioned facts, an object of the present invention is to provide, in a structure having a light assembly, an outer mirror assembly for a vehicle in which the quality of the external appearance of the mirror assembly can be improved.

In order to solve the aforementioned problems, according to the present invention, there is provided a mirror assembly for a vehicle, the mirror assembly comprising: (a) a mirror; (b) a light assembly having a lens; (c) a visor for accommodating the mirror and the light assembly, the visor having a visor opening into which the lens is fitted; (d) a connection element for movably connecting one end of the visor opening and one end of the lens; and (e) a bias element for biasing the light assembly such that the visor opening is substantially closed by the lens.

In accordance with another aspect of the present invention, there is provided a mirror assembly for a vehicle, the mirror assembly comprising: (a) a mirror; (b) a mounting plate for supporting the mirror; (c) a light assembly having a lens; (d) a visor for accommodating the mirror, the mounting plate and the light assembly, the visor having a visor opening into which the lens is fitted; and (e) a joint element for movably connecting the mounting plate and the light assembly.

In accordance with yet another aspect of the present invention, there is provided a method for assembling a mirror assembly for a vehicle, said mirror assembly including: (a) a mirror; (b) a mounting plate for supporting the mirror; (c) a light assembly having a lens; (d) a visor for accommodating the mirror, the mounting plate and the light assembly, wherein the visor is provided with a visor opening into which the lens is fitted, the visor comprising a visor rim and a visor cover, with the visor rim including one end of the visor opening and the visor cover including an end opposite to the one end of the visor opening, the method comprising the steps of: (i) movably connecting the light assembly to the mounting plate; (ii) movably connecting one end of the lens and the one end of the visor opening; (iii) mounting the visor rim onto a surface of the mounting plate; (iv) biasing the light assembly such that an opposite end of the mirror abuts against the end opposite to the one end of the visor opening; and (v) mounting the visor cover onto another surface of the mounting plate such that the visor opening is substantially closed by the lens.

BRIEF DESCRIPTION OF THE DRAWINGS

FIG. 3 is an enlarged perspective view of an engaging pawl illustrated in FIG. 1.

FIG. 4 is a vertical cross sectional view of a positioning region using the engaging pawl illustrated in FIG. 1, with the view taken along line 4—4 in FIG. 3.

DESCRIPTION OF THE PREFERRED EMBODIMENT

An embodiment of the present invention will be discussed below with reference to FIGS. 1–4.

Figure 1:
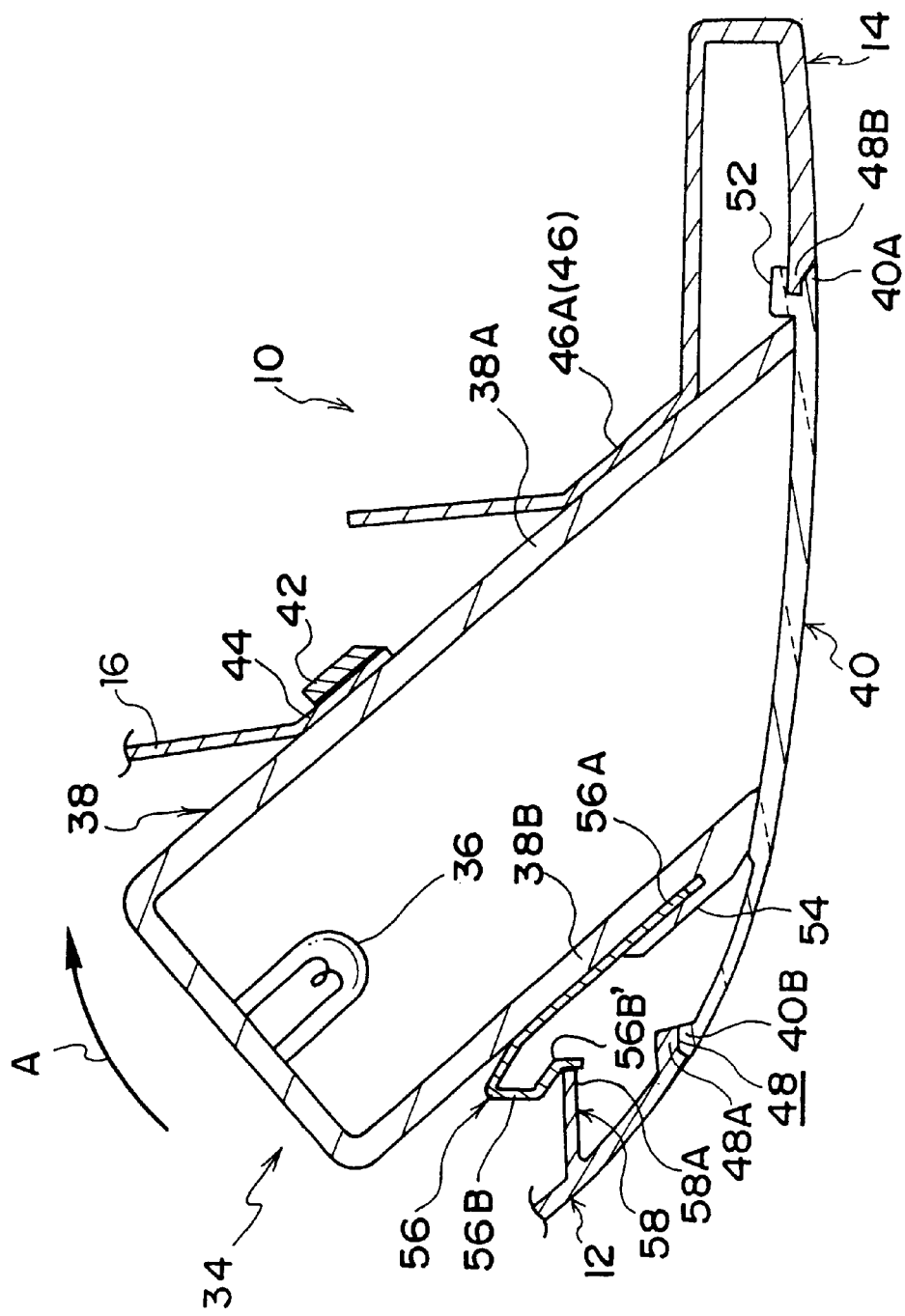
FIG. 1 is a vertical cross sectional view of main portions of a door mirror unit according to an embodiment of the present invention.
Figure 2:
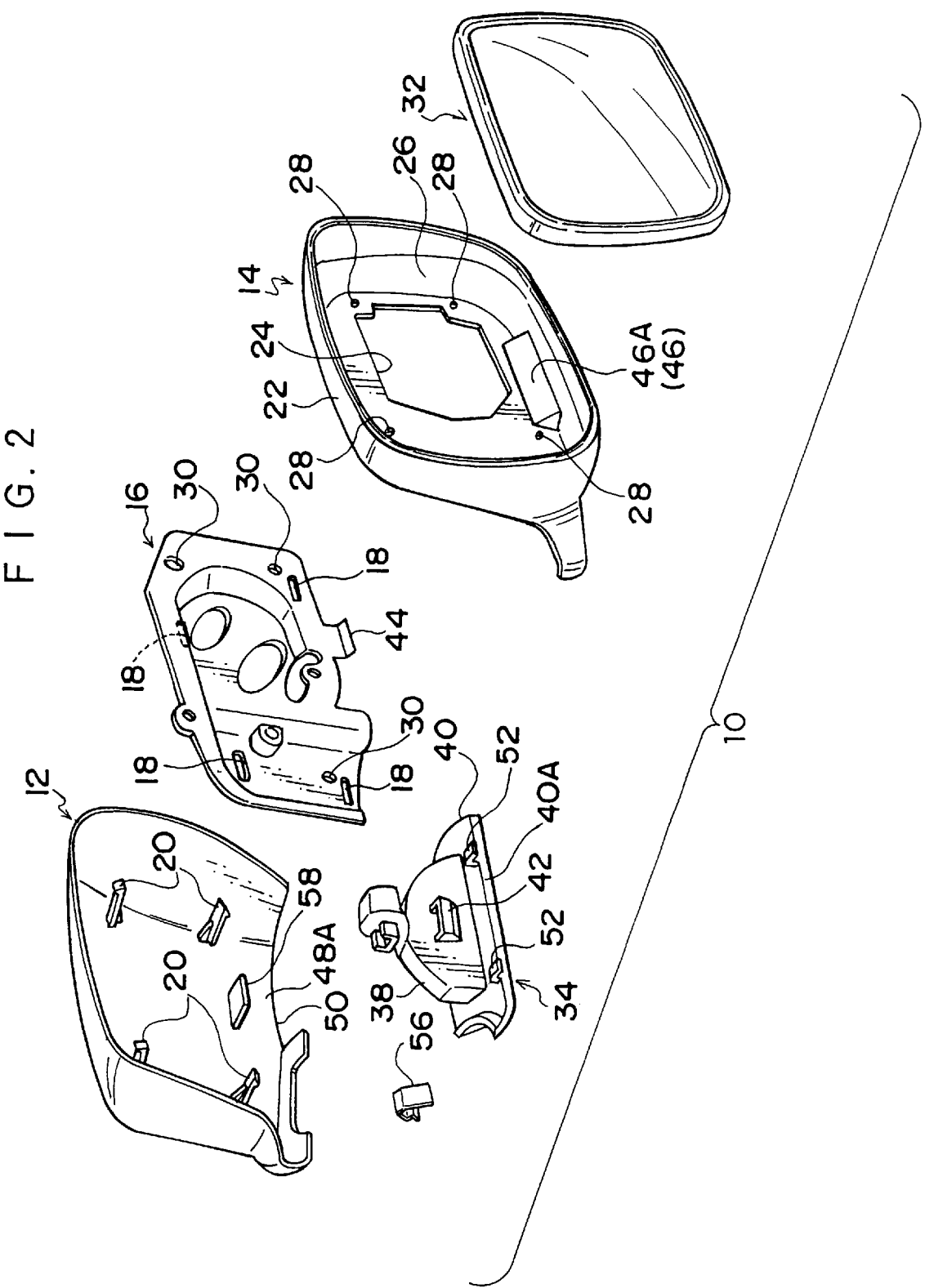
FIG. 2 is an exploded perspective view of the door mirror unit.

FIG. 2 is an exploded perspective view of an electric-powered retractable door mirror unit 10 according to the present embodiment. FIG. 1 is a vertical cross sectional view of main portions of the door mirror unit in its assembled state. As shown in these drawings, the door mirror unit 10 includes a visor cover 12 having a generally box-shaped configuration that opens toward a rear side of a vehicle and a generally frame-shaped visor rim 14 for covering the open end of the visor cover 12. Each of the visor cover 12 and the visor rim 14 is formed of a resin material. An outer contour of the door mirror unit 10 is defined by the visor cover 12 and the visor rim 14.

Between the visor cover 12 and the visor rim 14 is provided a mounting plate 16 that is formed of metal and has a generally rectangular plate shape. The mounting plate 16 has a lengthwise slot (hole) 18 at each of its four corners. A resin pawl 20 that is reinforced with a rib is provided at an inner area of the four corners of the visor cover 12 to correspond to the lengthwise slots 18. By elastically engaging the resin pawls 20 with the lengthwise slots 18, the visor cover 12 is fixed to the mounting plate 16. A drive that includes an electric-powered retractable unit, a mirror drive unit, and the like (not shown in the drawings) is mounted on the mounting plate 16.

The visor rim 14 comprises a frame 22, which forms an outer shape (design surface) of the visor rim 14, and a partition wall 26, which is formed at an intermediate portion within the frame 22 and has a relatively large opening 24 formed in a center of the partition wall 26. A through-hole 28 is formed at four corners of the partition wall 26, and through-holes 30 are formed at appropriate positions of the mounting plate 16 to correspond to the through-holes 28. By passing screws (not shown) through the through-holes 28 and 30, the visor rim 14 is fixed to the mounting plate 16 in a state in which the visor rim 14 is engaged with the visor cover 12.

A rear-view mirror 32 is provided at the side of the partition wall 26 in the visor rim 14 that faces the rear of the vehicle. The mirror 32 is connected to a mirror drive unit (not shown) through the opening 24 formed in the partition wall 26.

As shown in FIG. 1, a light assembly 34 is disposed in an inclined state at a lower portion of a space created by the visor cover 12, the visor rim 14 and the mounting plate 16. The light assembly 34 comprises a light source 36, a generally box-shaped reflector 38 for directing diffused light from the light source 26 in a fixed direction, and a lens 40 to irradiate light by refracting light toward a target position. The light source 36 is mounted at a bottom portion of the reflector 38, and the lens 40 is mounted at an open end (lower end portion) of the reflector 38.

An engaged portion 42 that has a generally C-shaped configuration when seen in cross section is formed at a substantial center of a back wall 38A in the reflector 38. Further, a tongue-shaped engaging protrusion 44 is formed at a substantial center of a lower end of the mounting plate 16, with the engaging protrusion 44 corresponding to the engaged portion 42. The engaging protrusion 44 is bent at an intermediate region thereof. By inserting the engaging protrusion 44 into the engaged portion 42, the light assembly 34 is engaged with (provisionally attached to) the mounting plate 16.

An abutment support 46 that has a substantially triangular configuration when seen from the side is integrally formed at an inner, central bottom region of the annular junction between the frame 22 and the partition wall 26. The abutment support 46 has an inclined surface 46A (see FIG. 1) that abuts against a back wall 38A of the reflector 38. By this abutment of the abutment support 46 against the back wall 38A of the reflector 38, the state in which the light assembly is mounted is stabilized more effectively. Further, the abutment support 46 also serves as a guide during mounting of the light assembly 34.

In a state in which the visor rim 14 is fitted over the visor cover 12, a visor opening 48 having a generally rectangular configuration is formed at a lower end of the visor rim 12. To describe in more detail, a notch 50 (see FIG. 2) having a curved configuration is formed at a lower end of the visor cover 12, and a peripheral portion in which the notch 50 is formed is a front peripheral portion 48A of the visor opening 48. Further, as shown in FIG. 1, a lower end of the visor rim 14 is formed in a generally C-shaped configuration, and a lower peripheral end thereof is a rear peripheral portion 48B of the visor opening 48. Moreover, a cross sectional configuration of the front peripheral portion 48A forms a predetermined concave shape (see FIG. 1), and a cross sectional configuration of the rear peripheral portion 48B forms a predetermined concave shape (see FIGS. 1 and 4) that is different from that of the cross sectional configuration of the front peripheral portion 48A.

The lens 40 of the light assembly 34 is fitted into the visor opening 48 having the structure described above. To describe in more detail, a pair of resin engaging pawls 52 (only one illustrated in FIGS. 3 and 4), each of which has a generally L-shaped configuration when seen in cross section, is integrally formed at the rear end 40A of the lens 40. As shown in FIG. 4, the rear peripheral end 48B of the visor opening 48 in the visor rim 14 (at both sides of the abutment support 46) is inserted into the engaging pawl 52. Further, the front end 40B of the lens 40 is formed in a predetermined protruding configuration when seen in cross section, and the front end 40B abuts against the front peripheral portion 48A of the visor opening 48.

The reflector 38 has a front wall 38B which is opposed to the back wall 38A. A spring fixing portion 54, into which is fitted a pressing spring 56, is formed integrally at a lower center of the front wall 38B of the reflector 38. The pressing spring 56 comprises a plate spring, and has a proximal end 56A which is inserted and fixed into the spring fixing portion 54 and a free end 56B formed in a curve opposite the proximal end 56A. The free end 56B curves in such a manner that resembles a generally V-shaped configuration, and has a tip 56B'.

A pressing protrusion 58 that has a rectangular plate-shaped configuration is formed integrally with the visor cover 12 at a position above the notch 50. When the light assembly 34 is assembled with the visor cover 12 and the visor rim 14, a tip 58A of the pressing protrusion 58 abuts and presses against the tip 56B' of the free end 56B of the pressing spring 56. Accordingly, the free end 56B of the pressing spring 56 is elastically deformed toward the front wall 38B.

An operation and effect of the present embodiment will next be described.

The door mirror unit 10 pertaining to the present embodiment is assembled as described below.

A drive unit (not shown) is set on the mounting plate 16. Thereafter, the light assembly 34 is provisionally secured on the mounting plate 16. Specifically, the engaging protrusion 44 of the mounting plate 16 is inserted and hooked into the engaged portion 42 of the light assembly 34 such that the mounting plate 16 supports the light assembly 34 in a dangling state. Next, the visor rim is fixed to the mounting plate 16 with screws (not shown), and then the mirror 32 is mounted on the visor rim 14.

At this time, the pair of engaging pawls 52 formed on the rear end 40A of the lens 40 is inserted into and engaged with the rear peripheral portion 48B of the visor rim 14. Further, the inclined surface 46A of the abutment support 46 of the visor rim 14 abuts against the back wall 38A of the reflector 38, whereby the light assembly is stably supported.

Thereafter, the proximal end 56A of the pressing spring 56 is inserted into the spring fixing portion 54 of the light assembly 34. Finally, the visor cover 12 is mounted on the mounting plate 16 such that the engaging pawls 20 of the visor cover 12 are inserted into the slots of the mounting plate 16.

Accordingly, the visor cover 12 is fitted over the visor rim 14 to form the visor opening 48 for mounting of the lens, whereby the lens 40 is completely mounted to the visor opening 48. As described above, the pair of engaging pawls 52 engages with the rear peripheral portion 48B of the visor rim 14, whereby the rear end 40A of the lens 40 is positioned with respect to the rear peripheral portion 48B of the visor rim 14 and the front end 40B of the lens 40 abuts against the front peripheral portion 48A of the visor cover 12.

Additionally, the above assembling process is only one example. In place thereof, any other process can be widely employed to assemble a door mirror unit.

In a state in which the door mirror unit 10 is assembled in the manner described above, the visor cover 12, the visor rim 14, and the lens 40, together with the mirror 32, form exposed outer surfaces. The visor cover 12, the visor rim 14 and the lens 40 form the primary design surface of the door mirror unit 10.

In the present embodiment, when the door mirror unit 10 is assembled, the tip 58A of the pressing protrusion 58 formed inside the visor cover 12 abuts and presses against the tip 56B' of the free end 56B of the pressing spring 56 such that the free end 56B is elastically deformed in a direction in which a distance between the free end 56B and the proximal end 56A becomes smaller.

Incidentally, the pair of engaging pawls 52 formed at the rear end 40A of the lens 40 engages with the rear peripheral portion 48B. A rotational force around this engagement point is generated due to an elastic restoring force of the pressing spring 56, with the rotational force being applied to the light assembly 34 such that the light assembly 34 rotates in the direction of arrow A in FIG. 1.

Thus, the front end 40B of the lens 40 of the light assembly 34 is pressed onto the front peripheral portion 48A of the visor cover 12. Namely, the front end 40B of the lens 40 abuts against the forward peripheral portion 48A of the visor cover 12. The abutment of the front end 40B and the front peripheral portion 48A forms a curved boundary between the lens 40 and the visor cover 12, with the portion at which the two oppose each other forming a step, or difference in level. Generally, such a step may vary depending on several factors, i.e., dimensional errors, fittedness, securing manner, etc. In the present embodiment, however, the step can be stably and reliably maintained at a desired accuracy under the influence of the rotational force or bias force that is applied to the light assembly 34. Therefore, the primary design surface (external appearance) of the door mirror unit 10 is not compromised. The door mirror unit 10 provided with the light assembly 34 according to the present embodiment does not sacrifice the quality of the unit's external appearance. Namely, the quality of appearance of the door mirror unit 10 is improved.

Further, in the present embodiment, when the door mirror unit 10 is assembled, the pressing spring 56 is elastically deformed due to the interaction between the pressing spring 56 that is formed by a plate spring and the pressing protrusion 58 that is formed integrally with the visor cover 12. The deformation of the pressing spring 56A produces a spring bias force applied to the light assembly 34 around the connection of the rear end 40A of the lens 40 and the rear peripheral portion 48B of the visor rim 14. The rotational force stabilizes the abutment between the lens 40 and the visor cover 12, and the strength of the abutment is neither too strong nor too weak. Namely, a desired accurate step at the region where the lens 40 and the visor cover 12 abut against each other can easily be obtained without imparting damage to both the front end 40B of the lens 40 and the front peripheral portion 48A of the visor cover 12.

It is conceivable that a light assembly can be directly fixed to a visor cover, such as the door mirror device disclosed in, for example, Japanese Utility Model Application Laid-Open (JP-U) No. 61-129645. In this case, because the light assembly is fixed in a state in which the light assembly slants with respect to an underside of the visor cover, there is the problem that assembly of the light assembly to the visor cover becomes extremely burdensome.

It should be noted that, in the door mirror device disclosed in JP-U No. 61-129645, an opening for replacement of parts is provided at a front surface portion of the visor cover, and a lid is fitted therein. While it is conceivable to assemble the light assembly to the underside of the visor cover while the lid is open, providing a lid at the visor cover become a necessary condition and there is the drawback that the structure grows more complex.

By contrast, in the door mirror unit 10 according to the present embodiment, the light assembly 34 is provisionally secured not to the visor cover 12 but to the mounting plate 16 through the engaging protrusion 44 and the engaged portion 42. In the process of assembly, the light assembly 34 is provisionally secured to the mounting plate 16, and the lens 40 is then positioned with respect to the visor opening 48 when the visor rim 14 is secured to the mounting plate 16. Thereafter, steps may be taken to ensure that the assembly is completed. As a result, according to the present embodiment, the structure does not become unnecessarily complex, and assembly of the light assembly can be improved.

Further, in comparison with a case in which both the positioning and assembly of the mounting plate 16 and the light assembly 34 are completed at a time, the present embodiment leaves room for final adjustment of the positioning of (the front end 40B of) the lens 40 with respect to (the front peripheral portion 48A of) the visor cover 12. Therefore, from this point of view, it becomes possible to keep the step formed at the boundary between the periphery of the visor opening and the periphery of the lens to a minimum with the invention of the present embodiment. Hence, in a structure provided with the light assembly 34, the quality of the external appearance of the door mirror unit 10 can be improved.

In the present embodiment, the light assembly 34 for illuminating a road surface in the vicinity of a side of a vehicle is situated in the visor opening 48 formed in the lower part of the visor cover 12 and the visor rim 14. However, the present invention is not limited to the same. The opening can be formed at another predetermined position on the visor. For example, together with the light assembly used in the present embodiment, a compact light assembly with a miniature lens may be additionally provided, with the miniature lens being disposed on a side portion of the door mirror visor and the larger light assembly being disposed at the underside of the door mirror visor for illuminating obstacles in order to measure the distance between the vehicle body and the obstacle at a given time (e.g., when the vehicle is put into a garage). In this sense, such a structure may also be included within the scope of the present invention. To supplement this point, the present invention includes not only an illumination device (lighting device) such as a lamp for underfoot lighting and a car width lamp for indicating vehicular width, but also includes a flash device such as a (supplementarily installed) turn signal lamp.

In the embodiment described above, the pressing spring 56 is mounted at the light assembly 34 and the pressing protrusion 58 is provided at the visor cover 12. However, the present invention is not limited to the same. A reverse structure may also be adopted. Namely, the pressing spring 56 can be mounted at the visor cover 12 and the pressing protrusion can be provided at the light assembly 34. In this case also, an action and effect substantially the same as those of the present embodiment may be obtained.

Further, in the present embodiment, the mutual action of the pressing spring 56 and the pressing protrusion 58 generates a rotational force that drives the light assembly 34 to rotate around the engaging point including the engaging pawls 52. In place of this structure, there can be provided a tension spring which produces a pulling force such that the light assembly 34 is drawn into the interior of the visor cover 12 (in an upward direction).

In relation to the preceding, the pressing spring 56 comprising the plate spring is used in the present embodiment. However, the present invention is by no means limited to the same. Another type of spring such as a coiled tension spring, a coiled compression spring or a Belleville spring may be used. A rubber having a predetermined hardness may also be used as a rotational force-generating member or biasing means.

Further, in the present embodiment, a pair of hook-shaped (i.e., generally L-shaped) engaging pawls is used for positioning or connection. However, the present invention is not limited to the same. In place thereof, a structure in which it is possible to position or connect one end of the lens to one peripheral portion of the visor may also be employed.

Moreover, in the present embodiment, the lens 40 has the pair of engaging pawls 52 formed at the lens 40. However, engaging pawls may be provided at both the lens and the visor rim so that they are mutually positioned with respect to each other.

Yet further, the invention is applied to a door mirror unit 10. However the present invention is not limited to the same. The present invention may also be applied to a fender mirror.

What is claimed is:

1. A mirror assembly for a vehicle, the assembly comprising:
   (a) a mirror;
   (b) a light assembly having a lens;
   (c) a visor for accommodating the mirror and the light assembly, the visor having a visor opening into which the lens is fitted;
   (d) a joint element for movably mounting a side of said light assembly to a mounting element located within said visor;
   (e) a connection element for movably connecting one end of the visor opening and one end of the lens; and
   (f) a bias element for biasing the light assembly such that the visor opening is substantially closed by the lens,
   wherein said joint element pivotally mounts said light assembly to said mounting element within said visor, and said bias element pivotally biases said light assembly such that the visor opening is substantially closed by the lens.

2. The mirror assembly of claim 1, wherein the bias element biases the light assembly such that an end opposite to said one end of the lens abuts against an end opposite to said one end of the visor opening.

3. The mirror assembly of claim 1, wherein the bias element is disposed within the visor.

4. The mirror assembly of claim 1, wherein the bias element comprises a spring member provided at one of the visor and the light assembly.

5. The mirror assembly of claim 1, wherein the connection element enables the light assembly to rotate around a region at which the one end of the visor opening and the one end of the lens are connected.

6. The mirror assembly of claim 1, wherein the connection element includes a male-female connection.

7. The mirror assembly of claim 1, wherein the visor comprises a visor rim that surrounds an outer periphery of the mirror and a visor cover that covers a rear surface of the mirror.

8. The mirror assembly of claim 1, wherein the visor rim includes the one end of the visor opening and the visor cover includes the end opposite to the one end of the visor opening.

9. The mirror assembly of claim 1, wherein said mounting element includes a mounting plate that also supports said mirror.

10. The mirror assembly of claim 1, wherein said mirror assembly is an outside mirror assembly attached to a side of a vehicle, and said light assembly illuminates a portion of ground adjacent to said vehicle.

11. A mirror assembly for a vehicle, the assembly comprising:
    (a) a mirror;
    (b) a mounting plate for supporting the mirror;
    (c) a light assembly having a lens;
    (d) a visor for accommodating the mirror, the mounting plate and the light assembly, the visor having a visor opening into which the lens is fitted;
    (e) a joint element for movably connecting the mounting plate and the light assembly,
    (f) a connection element for movably connecting one end of the visor opening and one end of the lens, and
    (g) a bias element separate from said joint element for biasing the light assembly such that the visor opening is substantially closed by the lens.

12. The mirror assembly of claim 11, wherein the connection element enables the light assembly to rotate around a region at which the one end of the visor opening and the one end of the lens are connected.

13. The mirror assembly of claim 11, wherein the bias element biases the light assembly such that an end opposite to said one end of the lens abuts against an end opposite to said one end of the visor opening.

14. The mirror assembly of claim 11, wherein the joint element includes an engaging protrusion and an engaged portion that is engaged by the engaging protrusion.

15. The mirror assembly of claim 14, wherein the engaging protrusion is provided at one of the mounting plate and the light assembly and the engaged portion is provided at the other of the same.

16. The mirror assembly of claim 11, wherein the visor comprises a visor rim that surrounds an outer periphery of the mirror and a visor cover that covers a rear surface of the mirror.

17. The mirror assembly of claim 16, wherein the visor rim includes the one end of the visor opening and the visor cover includes the end opposite to the one end of the visor opening.

18. The mirror assembly of claim 16, further comprising a mounting element for mounting the visor cover to the mounting plate.

19. The mirror assembly of claim 11, wherein said mirror assembly is an outside mirror assembly attached to a side of a vehicle, and said light assembly illuminates a portion of ground adjacent to said vehicle.

20. A method for assembling a mirror assembly for a vehicle, said mirror assembly including:
    (a) a mirror;
    (b) a mounting plate for supporting the mirror;
    (c) a light assembly having a lens;
    (d) a visor for accommodating the mirror, the mounting plate and the light assembly, wherein the visor is provided with a visor opening into which the lens is fitted, the visor comprising a visor rim and a visor cover, with the visor rim including one end of the visor opening and the visor cover including an end opposite to the one end of the visor opening, the method comprising the steps of:
(i) movably connecting the light assembly to the mounting plate;
(ii) movably connecting one end of the lens and the one end of the visor opening;
(iii) mounting the visor rim onto a surface of the mounting plate;
(iv) biasing the light assembly such that an opposite end of the mirror abuts against the end opposite to the one end of the visor opening; and
(v) mounting the visor cover onto another surface of the mounting plate such that the visor opening is substantially closed by the lens.

21. The method of claim 20, wherein a bias element for biasing the light assembly is provided.

22. The mirror assembly of claim 20, further comprising the step of mounting the assembled mirror assembly on the side of a vehicle.

* * * * *